Sept. 6, 1966 A. C. BERNSTEIN 3,271,519

VOLUME CONTROL CIRCUIT

Filed Nov. 9, 1962 2 Sheets-Sheet 1

INVENTOR
ALLAN C. BERNSTEIN
BY
Burgess, Dinklage & Sprung
ATTORNEYS.

INVENTOR
ALLAN C. BERNSTEIN
BY
Burgess, Dinklage & Sprung
ATTORNEYS.

United States Patent Office 3,271,519

Patented Sept. 6, 1966

3,271,519

VOLUME CONTROL CIRCUIT

Allan C. Bernstein, Kings Point, N.Y., assignor to Executone, Inc., Long Island City, N.Y., a corporation of New York Filed Nov. 9, 1962, Ser. No. 236,526
4 Claims. (Cl. 179—1)

Figure 1:
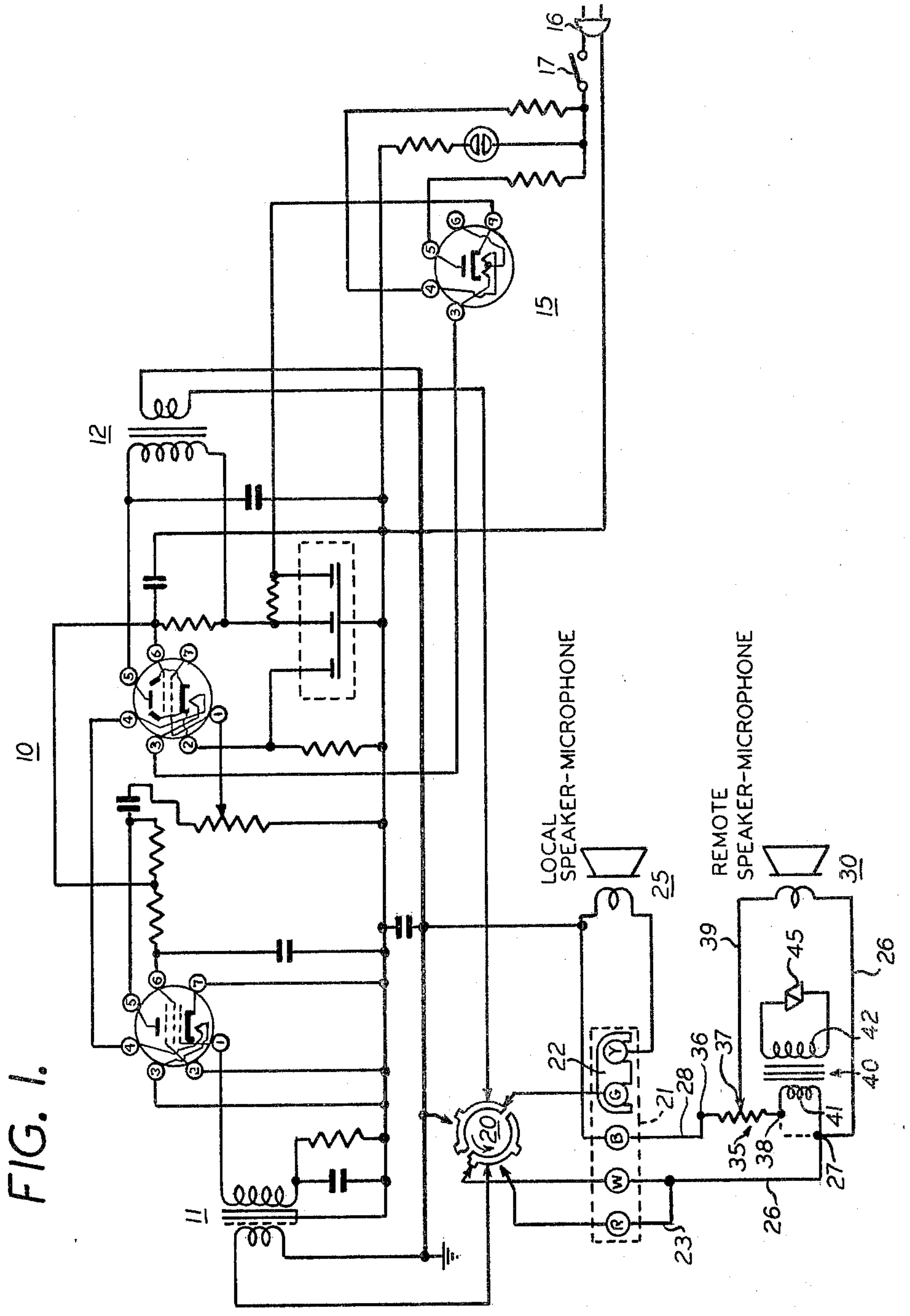

This invention relates to voice transmitting and receiving circuits such as used in intercommunication systems having interconnected local and remote stations and, more particularly, to a novel volume control circuit whereby a local station, having an amplifier and a sound transducer, may be interconnected to a remote station having a sound transducer connected by a two-wire circuit with control of the volume level at the remote station's sound transducer, when the latter is operating as a loud speaker, with a minimum effect upon the transmission when the remote station's sound transducer is used as a microphone.

Intercommunication circuits involve two or more stations each provided with a sound transducer which may operate either as a loud speaker or as a microphone. These stations are interconnected by voice circuits and by signaling circuits, so that intercommunication may be established between a pair of the stations. Usually the main or local station will also have an amplifier associated therewith and particularly with its sound transducer. The sound transducers require a relatively high input voltage when acting as loudspeakers, and have a relatively low output voltage when operating as microphones.

There are many advantages in using a two-wire voice circuit for interconnecting a local station, having an amplifier and a sound transducer, with a remote station having a sound transducer. In the first place, there is a reduction in the amount of wiring required. Another advantage is the ease of protecting a two-wire line against electrical noise pick-up, and the ease of balancing such a two-wire line for minimum cross-talk when the two-wire line is included with other similar lines in a common cable. A notable disadvantage preventing the use of a two-wire line for these purposes has been the difficulty of providing effective incoming volume control without adversely affecting outgoing speech.

An object of the present invention is to provide an intercommunication system including a two-wire voice circuit interconnecting a local station and a remote station and which will have the advantages of a two-wire voice circuit without the disadvantages thereof.

To this end, in accordance with the present invention, a two-wire voice circuit is used to interconnect a local station, having an amplifier and a first sound transducer, to a remote station having a second sound transducer. As stated, both of the sound transducers have a relatively low voltage output responsive to sound input, and require a relatively high input voltage for producing a sound output. In accordance with the present invention, an adjustable resistance is connected in one wire in series with the second sound transducer to act as a volume control, as by having one terminal of the resistance connected to the one wire and the adjustable tap of the resistance connected to a terminal of the second sound transducer.

To provide effective incoming volume control without adversely affecting outgoing speech, a voltage variable impedance is connected between the normally free terminal of the resistance and the other wire. This voltage variable impedance has an impedance value, at the relatively high required input voltage, so low as to substantially constitute a short circuit between the resistance and the other wire whereby, at the relatively high required input voltage, the adjustable resistance or volume control will function in the nature of a potentiometer. On the other hand, the impedance value of the voltage variable impedance, at the relatively low output voltage of the second transducer, responsive to sound input, is so high that the voltage variable impedance constitutes, in effect, an open switch or an open circuit between the adjustable resistance and the other wire of the voice circuit.

One known form of voltage variable impedance is known as a varistor. Such a varistor may comprise two matched silicon junctions connected in parallel and with opposite polarity. The voltage-impedance or resistance characteristic of a varistor of this type is such that, at voltages below approximately 0.4 volt, the varistor will have a very high resistance as, for example, 40,000 ohms. On the other hand, at voltages above approximately 0.8 volt, the varistor has a very low resistance, for example of the order of 4 ohms. This is a ratio of about 10,000 to 1, and for lower and higher voltage ranges, the resistance variation is even greater.

Thus, at low voltages of 0.4 volt and less, the varistor may be regarded as an open circuit or an infinite resistance, and at higher voltages, of the order of 0.8 volt or greater, the varistor may be regarded as a closed switch or a short circuit. Accordingly, a further object of the invention is to provide an intercommunication system having a two-wire voice circuit interconnecting such a local station with such a remote station, in which an adjustable resistance is connected in one wire in series with the sound transducer of the remote station, and a varistor is connected in series between the normally unconnected terminal of the resistance and the other wire.

Figure 2:
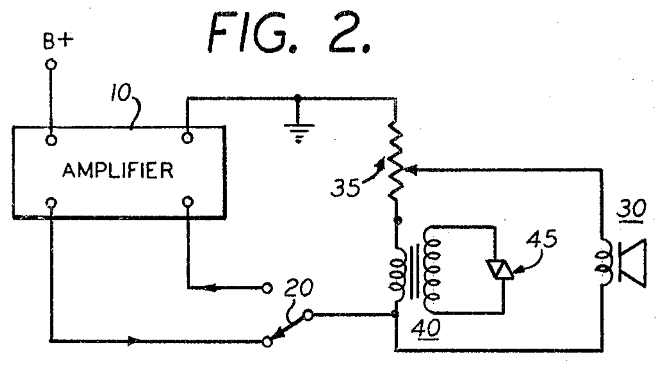
Figure 3:
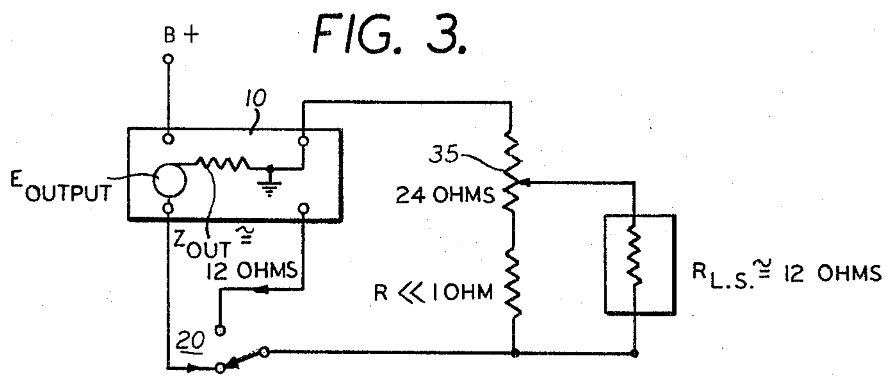
Figure 4:
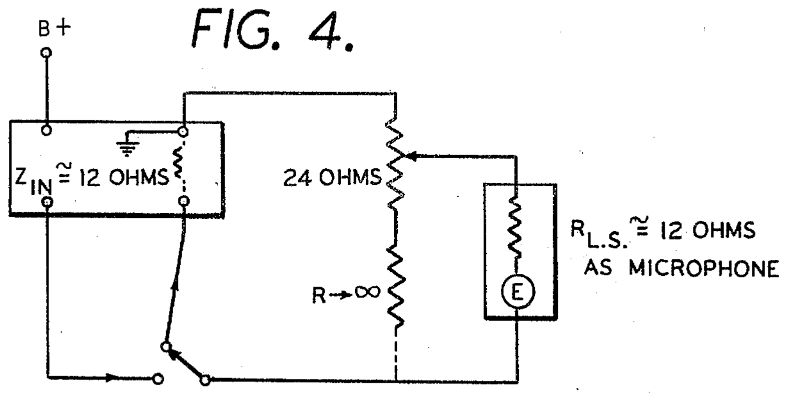

As the voltage levels of an intercommunication system of the mentioned type are too low for effective operation of the varistor in changing from a short circuit condition to an open circuit condition, a transformer is preferably provided and has a primary winding connected in series between the free terminal of the adjustable resistance and the second wire of the voice circuit. The secondary of this transformer has the varistor connected thereacross. The ratio of the transformer is so selected, in accordance with the voltage levels of the intercommunication system, that the normal voltages used to produce sound output from the sound transducer, even weak sounds, at the remote station will still be in excess of 0.8 volt when applied to the varistor so that the varistor will act as a substantial short circuit or closed switch. For an understanding of the principles of the invention, reference is made to the following description of a typical embodiment thereof, as illustrated in the accompanying drawings. In the drawings:

FIG. 1 is a schematic wiring diagram of a two-station intercommunication system embodying the invention;

FIG. 2 is a simplified schematic wiring diagram of the intercom system shown in FIG. 1, omitting a number of components not necessary for an understanding of the invention; and FIGS. 3 and 4 are greatly simplified wiring diagrams illustrating the action of the volume control circuit when the transducer at the remote station is acting as a loud speaker and when the transducer at the remote station is acting as a microphone, respectively.

Referring to FIG. 1, a local station is illustrated as including an amplifier 10, a power supply 15, a "talk-listen" switch 20, and a combination loud speaker and microphone, or transducer, 25. The amplifier 10 forms no part of the present invention, and may be of any suitable design. Preferably, it is a negative feed back amplifier having an input transformer 11, and an output transformer 12. The power supply 15 may be connected to a convenience outlet through the medium of a plug 16, and an "on-off" switch 17 is provided. The power supply 15 provides the operating potentials for the amplifier and for the intercommunication system generally.

The talk-listen switch 20 is connected to the amplifier 10 and also to a terminal board 21. Through the medium of the illustrated terminals R, W, B, G, and Y, of the terminal board 21, the talk-listen switch 20 is connected to the remote station as well as to the transducer 25 which is operable to function both as a loud speaker and as a microphone. A jumper 22 interconnects the terminals G and Y. The transducer 25 is connected across the terminals B and Y, and the talk-listen switch 20 is connected to the terminals R, W, and G. In the illustrated position of switch 20, the local station is set to receive. When it is desired to transmit, the switch 20 is rotated approximately 30°. In the "receive" position of switch 20, the transducer 25 is connected to the output of the amplifier 10 and acts as a loud speaker. In the "transmit" position of switch 20, the transducer 25 is connected to the input of amplifier 10 and acts as a microphone.

The terminal B is a grounded terminal, as will be noted from the drawing, and is connected to ground in common with one side of the transducer 25. Normally, there would be a three-wire connection between the terminal board 21 and the remote station, with the remote station having one wire, connected to the grounding terminal B, and a pair of wires connected to the terminals R and W, one of the wires being used for speech transmission from the remote station to the local station and the other wire being used for speech reception by the remote station from the local station. In accordance with the invention, these latter two wires are interconnected, as by a jumper 23 interconnecting the terminals R and W.

The remote station includes a transducer 30 which functions both as a loud speaker and as a microphone. In accordance with the invention, one terminal of the remote transducer 30 is connected by a wire 26, through a junction point 27, to the terminals R and W. A second wire 28, forming a two-wire pair with the wire 26, connects the grounded terminal B to an end 36 of an adjustable resistance 35 having a second terminal 38. A wire 39 connects variable tap 37 of the adjustable resistance to the opposite terminal of the remote transducer 30. The adjustable resistance 30 acts as a volume control for the transducer 30.

In accordance with the preferred embodiment of the invention, a remote transformer 40 is provided and has its primary winding 41 connected between terminals 38 of resistance 35 and the junction point 27. The secondary winding 42 of transformer 40 has connected, across its terminals, a voltage variable impedance 45, which is preferably a varistor. A voltage variable impedance, consisting of varistor 45 and transformer 40, is thus effectively connected in series between terminal 38 of adjustable resistance 35 and the junction point 27 in the wire 26 of the two-wire pair 26–28. Varistor 45 is preferably a pair of matched silicon junctions in parallel and oppositely poled.

When operating as a microphone, the remote transducer 30 has a relatively low voltage output responsive to a voice input. However, when the transducer 30 is acting as a loud speaker, it requires a relatively high input voltage. The characteristics of varistor 45 are such that, with the relatively low output voltage available when transducer 30 is operating as a microphone, the varistor 45 has a very high resistance such that it, in effect, acts as an open circuit or open switch between terminals 38 and junction point 27. On the other hand, under the relatively high voltage conditions prevailing when the transducer 30 is operating as a loud speaker, the varistor 49 has a very low resistance, of such a low value that it forms, in effect, a short circuit or closed switch connecting the resistance terminal 38 to the junction 27.

The transformer 40 is provided to increase the operating potentials normally prevailing in the intercommunication system to a value at which the varistor can be "triggered" between its high resistant state and its very low resistant state. This operation will perhaps be understood best by reference to a typical example.

The varistor 45 may be, for example, a silicon varistor such as that known as the "Schauer SV1" silicon varistor. This varistor has, in a typical example, a resistance of approximately 40,000 ohms at an impressed voltage of 0.4 volt, and a resistance of 4.0 ohms at an impressed voltage in excess of 0.8 volt. In the practical example, the transformer 40 has a ratio of about 35 to 1. If transformer 40 is considered as an ideal transformer, it would reduce the "short circuit" voltage for varistor 45, with a voltage of 0.8 volt applied to the primary winding 41, to approximately 23 mv. The voltage level at which the transducer 30 operates usefully as a loud speaker can range from about 5 volts to about 250 mv. in practical circuits. Therefore, the varistor can be treated as a short circuit throughout this range. With a transformer ratio of 35, the 250 mv. input voltage of the transducer 30, when operating as a microphone, would correspond to a little more than 0.8 of a volt as applied to varistor 45. Thereby, the varistor 45, when the transducer 30 is operating as a loud speaker, will function as a short circuit or a closed switch in series with the adjustable resistance 35. The adjustable resistance 35, in such case, thus becomes, in effect, a potentiometer as its terminal 38 is effectively connected to the junction point 27 and is substantially at the potential of junction point 27.

When transducer 30 is operating as a microphone, it has an output voltage in the range of 1 mv. to 4 mv. maximum. This maximum, considering the transformer ratio of 35, is well below the voltage at which the varistor 45 ceases to be a very high resistance and thus it acts essentially as an open circuit or open switch between the junction point 27 and the terminal 38 of adjustable resistance 37. Thus, if the value of 0.4 volt mentioned above is divided by 35, this will correspond to an 11 mv.

In the practical example under consideration, the voice coil of transducer 30 has a nominal impedance of 12 ohms, the amplifier 10 has a nominal input and output impedance of 12 ohms, and the volume control has a total resistance of 24 ohms. Maximum theoretical attenuation of return speech, with the volume control 35 in its minimum position, is approximately 6 db, since the generator impedance of the voice coil acting as a microphone, plus the input impedance of the amplifier and plus the volume control impedance equals 48 ohms. Theoretically, therefore, $^{12}/_{48}$ of the generator signal would be effective across the input of the amplifier. With the volume control 35 in its maximum position, the loop impedance of the input circuit would be 12 ohms for the source impedance plus 12 ohms for the input impedance of the amplifier. $^{12}/_{24}$ of this signal would appear across the input of the amplifier. From this, it will be realized that operating the volume control to the minimum position, providing theoretically almost infinite attenuation when transducer 30 is operating as a loud speaker, would give an attenuation, as regards return speech, of only approximately 6 db, due to the 2 to 1 voltage ratio. For practical settings of volume control 35, such as, for example, 3 to 15 db attenuation as a loud speaker, the effect on return speech would be much less than 6 db, and, in practice, almost negligible.

For the sake of comparison, it may be noted that if the varistor transformer combination is replaced by a conventional connection of the volume control between the conductors 26 and 28, as shown by broken lines, the attenuation for any setting of the volume control would be the same in both directions. That is, if there would be a 15 db attenuation when transducer 30 is operating as a loud speaker, there would be a 15 db attenuation when transducer 30 is operating as a microphone. The use of the invention arrangement allows the volume control 35 to act as a series adjustable impedance in the circuit when transducer 30 is operating as a microphone, and allows the volume control 35 to act as a potentiometer connected across the conductors 26 and 28 when the remote transducer 30 is operating as a loud speaker. Thus, unequal attenuation in two directions is attained.

It should be understood that while the use of a transformer is essential to proper operation of the volume control under the practical circuit constants mentioned above, such a transformer may not be required if the system is operated at much higher impedance levels. In accordance with the invention, a modification of the characteristics of the varistor with a transformer is always effected in such a manner that the varistor will transfer from an open circuit condition to a short circuit condition at a value just safely above the maximum voltage level where no transmission losses are desired, or in the specific instance illustrated, the maximum output voltage level when the transducer 30 is operating as a microphone. While the volume control arrangement has been illustrated as applied to an intercommunication system involving a local station and a remote station, it will be appreciated that the volume control has other applications rather than being limited solely to use in an inter-communication system of the type illustrated.

The operating conditions thus described will probably be better understood from the simplified diagrams of FIGS. 2, 3, and 4. Referring to FIG. 2, the amplifier 10 is illustrated in block form, and the talk-listen switch 20 is illustrated as a simple single pole, double throw switch. The connections to the remote station are otherwise illustrated as in FIG. 1. FIG. 3 illustrates the effect of the operation of the system when the remote station is receiving with the transducer 30 operating as a loud speaker. In this case, the adjustable resistance 35 is connected across the pair of wires 26–28 in series with the varistor, acting as a short circuit or closed switch, so that the adjustable resistance 35 is functioning as a potentiometer. In the schematic illustration of FIG. 4, the remote transducer 30 is operating as a microphone. In this case, varistor 45 acts as an open circuit or open switch between the adjustable resistance 35 and the wire 26. Thus, the adjustable resistance 35 merely acts as a series resistance included between the wire 28 and the wire 39.

While a specific embodiment of the invention has been shown and described in detail to illustrate the application of the principles of the invention, it will be understood that the invention may be embodied otherwise without departing from such principles.

As can be appreciated by the artisan from the foregoing description, the invention provides a two-way audio intercommunication system including a local sound transducer 25, a remote sound transducer 30, conductor means 26 and 28 defining an audio signal transmission line extending between the local and remote transducers 25 and 30 respectively, an amplifier 10, switching means 20 disposed for selectively connecting the local transducer 25 to the input of the amplifier 10 and connecting the output of said amplifier 10 to the transmission line, and for selectively connecting the local transducer 25 to the output of the amplifier 10 and connecting the input of said amplifier 10 to the transmission line, and an attenuator network.

Both of the transducers 25 and 30 are reversibly operable as microphones to generate a corresponding audio signal output at a relatively low level in response to a sound input, and as loudspeakers to reproduce a significantly higher level audio signal input as a sound output. In relation to the audio signal output level of either transducer 25 or 30 when being used as a microphone, the higher level audio signal which is reproduced by the other transducer 30 or 25 has an amplitude level approximately equal to the signal output level of the microphone transducer multiplied by the gain of the amplifier 10 and the over-all attenuation factor between the output of said amplifier 10 and the reproducing transducer.

The switching means 20 enables the inherent reversible operation capabilities of the transducers 25 and 30, which preferably are conventional loudspeakers, to be utilized in a practical manner.

While many switching arrangements are possible which will enable two-way operation, the one exemplified by FIG. 1 is preferable in that the remote transducer 30 is kept coupled to the transmission line, and that the effective direction of signal amplification between the local transducer 25 and the line is reversed by the talk-listen switch 20. In this way, the amplifier 10, talk-listen switch 20 and local transducer 25 can be conveniently grouped together. For transmitting communications from the local transducer 25 to the remote transducer 30, the talk-listen switch 20 is operated to connect the local transducer 25 to the input of amplifier 10, and to connect the output of amplifier 10 in shunt to the line conductors 26 and 28. Thus, the low level output signal of the local transducer 25 will be amplified and transmitted over the line to the remote transducer 30 for reception and reproduction thereby. For transmitting communications from the remote transducer 30 to the local transducer 25, the talk-listen switch 20 is operated to reverse the aforementioned local transducer 25 and amplifier 10 terminal connections so that the local transducer 25 is connected to the output of the amplifier 10 and the input of said amplifier 10 is connected to the line.

The attenuator network which comprises the potentiometer 35, transformer 40 and varistor 45 is interposed in the audio signal path between the transmission line and the remote transducer 30. In general, this attenuator network is operatively connected to the transmission line and to the remote transducer 30 so as to couple same to the line for both receiving and transmitting communications thereover, and includes means, such as the varistor 45, responsive to the audio signal output of the transducer 30, and to the audio signal level on the transmission line to effect a limited attenuation of outgoing audio signals generated by the transducer 30 and to effect a selected, but greater attenuation of the amplified audio signals originating at the local transducer 25 and transmitted over the line for reproduction by the remote transducer 30. This feature of the invention is more apparent from FIGS. 2, 3 and 4. In connection with the specific varistor 45 circuit arrangement, wherein the varistor 45 is connected in shunt across the secondary of transformer 40, and the primary thereof is connected in series with the potentiometer 35 resistance element, it should be noted that such specific circuit is a preferred circuit since by reason of the step-up ratio of the transformer 40, the effective sensitivity of the varistor 45 is increased. Where such sensitivity multiplication is not desired, the transformer 40 can be omitted and the varistor 45 connected directly in series with the potentiometer 35 in the same manner as the primary of transformer 40 in the illustrated circuits.

As used herein, the term "low level audio signal" refers to the characteristic audio signal level range corresponding to the output of a loudspeaker type transducer 25, 30 when used as a microphone, and the term "high level audio signal" refers to the characteristic level of the output signal of such loudspeaker transducer 25, 30 when used as a microphone and amplified by the amplifier 10. It is such high level audio signals that are applied to the attenuator network for reproduction by the transducer 30. In conventional loudspeakers, there is a marked difference between the level of an incoming audio signal which will produce an audible response, and the level of audio signal output which such loudspeakers produce when operating as microphones. Hence, the attenuator network provided by the invention can be considered as one which can automatically distinguish between the operation of the remote transducer 30 as a microphone and its operation as a loudspeaker.

The voltage-resistance characteristics of the varistor 45 are chosen such that taking into account the step-up ratio of transformer 40, the reflected impedance of said varistor 45 at the transformer 40 primary is so high as to substantially constitute an open circuit, as indicated in FIG. 4, whenever the transducer 30 is operated as a microphone, and so that the reflected impedance of said varistor 45 is so low as to substantially constitute a short circuit, as indicated by FIG. 3, whenever the transducer 30 is operated as a loudspeaker.

Accordingly, the attenuator network is in effect a dual range attenuating device. When the transducer 30 operates as a microphone, the potentiometer 35 resistance element series connection through transformer 40 primary is effectively opened and the resistance portion of said potentiometer 35 between its terminal connected to the conductor 28 and its adjustable tap is placed in series with the transducer 30. When the transducer 30 operates as a loudspeaker, the resistance element of potentiometer 35 is effectively connected in shunt to the line conductors 26 and 28. With the potentiometer 35 connected in series with transducer 30, in the manner of a rheostat or two-terminal adjustable resistor, there is a limited attenuation of the transducer 30 output signal, whereas when the potentiometer 35 is connected in shunt to the line conductors 26 and 28, the attenuation of the incoming amplified audio signal will be greater.

For example, in FIGS. 3 and 4 with the tap of potentiometer 35 set at the midpoint of its resistance elements, i.e. the 12 ohm position, the input voltage delivered to the amplifier 10 of the transducer 30 operating as a microphone will be approximately one-third that of the internal voltage generated by said transducer 30, and approximately one-half that of the terminal voltage generated thereby (for a 12 ohm internal resistance in transducer 30). When the transducer 30 is operated as a loudspeaker, the input voltage delivered to it from the output of amplifier 10 will be approximately one-fifth that of the internal output voltage of said amplifier 10, and approximately one-third that of the terminal output voltage thereof. Consequently, the outgoing audio signals from transducer 30 will experience less attenuation than will the incoming audio signals thereto. It should be noted that by reason of the adjustable feature of the potentiometer 35, the actual attenuation factors applied to the incoming and outgoing audio signals will be dependent upon the particular setting of the resistance tap, but for any given tap setting, incoming audio signals will experience a greater attenuation than outgoing audio signals, and thus the potentiometer 35 can be effectively utilized to control the volume of transducer 30 when operated as a loudspeaker, and to a limited extent to control the audio input to amplifier 10 when such transducer 30 is used as a microphone.

What is claimed is:

1. An audio intercommunication system which comprises a local sound transducer, a remote sound transducer, both of said transducers being reversibly operable to generate a corresponding audio signal output at one level in response to a sound input and to reproduce a higher level audio signal input as a sound output, conductor means defining an audio signal transmission line extending between said local and remote transducers, an amplifier, switching means disposed for selectively connecting said local sound transducer to the input of said amplifier and connecting the output of said amplifier to the transmission line, said switching means being also disposed for selectively connecting said local sound transducer to the output of said amplifier and connecting the input of said amplifier to the transmission line, and an attenuator network operatively connected to said transmission line and to said remote sound transducer to couple same to said line for receiving and reproducing audio signals transmitted thereover upon the application of a sound input to said local transducer, and to couple said remote transducer to said line for transmitting to the local transducer for reproduction thereby audio signals corresponding to a sound input applied to the remote transducer, said attenuator network including means responsive to the audio signal output level of said remote transducer and to the audio signal level on the transmission line to effect a limited attenuation of outgoing audio signals generated by said remote transducer and to effect a selected, but greater attenuation of amplified audio signals originating at said local transducer and transmitted over said line for reproduction by said remote transducer, whereby when said local transducer is connected to the input of the amplifier and the output of the amplifier is connected to the transmission line for transmission of audio communications from said local transducer to said remote transducer, the sound output at the remote transducer is reduced by the attenuator network to a level corresponding to said selected attenuation, and when said local transducer is connected to the output of the amplifier and the input of the amplifier is connected to the transmission line for reception and reproduction of audio communications from said remote transducer to said local transducer, only a limited attenuation by said attenuator network of the audio signal generated by the remote transducer occurs.

2. The audio intercommunication system according to claim 1 wherein said audio signal transmission line is constituted by a pair of conductors, and wherein said attenuator network comprises a potentiometer having a resistance element connected in series with the primary of a transformer, and an adjustable resistance tap, said series connected resistance element and transformer primary being also connected in shunt to said pair of conductors, and a varistor connected in shunt to the secondary of said transformer, and wherein said remote sound transducer is connected in shunt to the resistance tap of said potentiometer and to a conductor of said pair connected in common to the primary of said transformer, said varistor having a voltage-resistance characteristic whereby its reflected impedance at the transformer primary in relation to the total series resistance of the potentiometer is sufficiently high as to constitute a substantial open circuit when excited by a relatively low level audio signal generated by said remote sound transducer, and sufficiently low with respect to the total series resistance of the potentiometer as to constitute a substantial short circuit when excited by a relatively high level audio signal impressed across said pair of conductors by the application of a sound input to the local sound transducer and the amplification by the amplifier of the audio signal generated by said local sound transducer.

3. In an audio intercommunication system having a two-terminal sound transducer reversibly operable to generate a low level audio signal upon the application of a sound input thereto, and to audibly reproduce a higher level audio signal applied to such transducer, and a pair of conductors for transmitting such low level audio signals from the sound transducer and for transmitting such high level audio signals thereto, a volume control circuit which comprises a potentiometer and two-terminal voltage variable impedance means, said potentiometer having a resistance element connected in series with said variable impedance means and an adjustable resistance tap connected to one terminal of the sound transducer, one terminal of said resistance element being connected to one of said conductors, and the other of said conductors being connected in common with the other terminal of said variable impedance means and with the other terminal of said transducer, said variable impedance means having voltage-impedance characteristics whereby the effective impedance of said variable impedance means is sufficiently low as to constitute a short circuit when excited by a high level audio signal applied to said conductor pair, and sufficiently high as to constitute an open circuit when excited by a low level audio signal applied by the transducer through said resistance tap and the common connection to said variable impedance means, whereby low level audio signals generated by said transducer experience a limited and relatively low attenuation, and high level audio signals applied to said transducer experience a greater attenuation.

4. The volume control circuit according to claim 3 wherein said voltage variable impedance means comprises a transformer having a primary connected in series with the resistance element of the potentiometer and connected in common with one terminal of said transducer and one conductor of said pair, and a varistor connected in shunt to the secondary of said transformer.

References Cited by the Examiner

UNITED STATES PATENTS

| | | | |
|---|---|---|---|
| 1,913,909 | 6/1933 | Wolfe | 325—480 |
| 2,157,557 | 11/1936 | Muller | 179—1 |
| 2,199,190 | 4/1940 | Shore | 325—480 |
| 3,001,149 | 9/1961 | De Quant | 333—14 |
| 3,046,354 | 7/1962 | Clemency | 179—81 |

KATHLEEN H. CLAFFY, *Primary Examiner.*

ROBERT H. ROSE, *Examiner.*

J. W. JOHNSON, *Assistant Examiner.*